United States Patent Office 3,012,903
Patented Dec. 12, 1961

3,012,903
METHOD OF BRAZING
Arthur T. Cape, Los Angeles, Calif., assignor to Coast Metals, Inc., Little Ferry, N.J., a corporation of Delaware
No Drawing. Filed May 3, 1960, Ser. No. 26,430
4 Claims. (Cl. 117—46)

This invention relates generally to improvements in brazing and coating, but has reference more particularly to brazing methods in which alloys containing boron and/or silicon are utilized as the brazing alloy.

If nickel fluoride ($NiF_2$) is mixed, in amounts up to 50%, with any nickel-silicon-boron brazing alloy, as for example, the alloys described in U.S. Patents Nos. 2,743,177 and 2,755,183, and the mixture is utilized for brazing purposes when heated in a hydrogen atmosphere, an exothermic reaction occurs, the nickel fluoride is reduced, and the nickel which is left is readily absorbed in the brazing alloy. The brazing alloy is thus diluted to the extent of the increased nickel content. This reaction is represented as follows:

$$NiF_2 + H_2 = 2HF + Ni$$

A similar reaction occurs when iron fluoride, manganese fluorides and cobalt fluorides ($CoF_2$ and $CoF_3$) are mixed with a nickel-silicon-boron alloy and heated in a hydrogen atmosphere. A dilution of the brazing alloy takes place, and the diluted brazing alloy, in the brazed joint, is much more ductile than the undiluted brazing alloy. Moreover, this occurs without any significant change in the temperature at which brazing is accomplished, because, as stated, the reaction is exothermic.

If the brazing is performed in an argon atmosphere, instead of a hydrogen atmosphere, then, with a brazing alloy containing boron and/or silicon, the boron and/or silicon reacts with the fluoride, forming boron-trifluoride and/or silicon tetrafluoride, which are gases and disappear. In this manner, a double effect is produced, that is, the boron and/or silicon is reduced by two methods (1) dilution, and (2) by actually being removed. These reactions are represented as follows:

$$3NiF_2 + 2B = 2BF_3 + 3Ni$$

$$2NiF_2 + Si = SiF_4 + 2Ni$$

The invention is not limited to the use of these fluorides with nickel-base alloys, but is applicable also to the use of the fluorides with cobalt-base, iron-base, manganese-base alloys, or other alloys containing boron and/or silicon.

Although the invention has been described particularly with reference to brazing, it is also applicable to any method in which a deposit of metal is applied to a metal base, and the deposit is melted, either at the time it is laid down, or subsequently. Thus, the invention is applicable to spray methods, whether the sprayed metal is used as a coating, as in hard facing, or as a means of joining other metals. The making of a deposit would encompass both spraying and coating. Boron and silicon both tend very much to react with the fluoride during the spraying process. Argon atmospheres are often used in connection with spraying. In many cases, an alloy is sprayed and then melted in a reducing atmosphere, so that the same effect is produced as in brazing.

The method, as thus described, may be broadly illustrated by the following flow diagram:

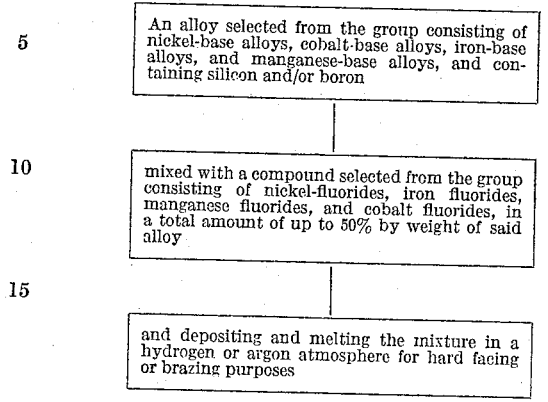

It will be understood that various changes may be made in the invention without departing from the spirit of the invention or the scope of the appended claims.

Having thus described my invention, I claim:

1. The method which comprises mixing with an alloy selected from the group consisting of nickel-base alloys, cobalt-base alloys, iron-base alloys, and manganese-base alloys, said alloy containing an element selected from the group consisting of boron, silicon and mixtures of boron and silicon, at least one compound selected from the group consisting of nickel fluoride, iron fluoride, manganese fluorides and cobalt fluorides, in a total amount of up to 50% by weight of said alloy, depositing said mixture on a metal base, and melting the deposit in an atmosphere selected from the group consisting of hydrogen and argon atmospheres.

2. The method which comprises mixing with an alloy selected from the group consisting of nickel-base alloys, cobalt-base alloys, iron-base alloys, and manganese-base alloys, said alloy containing an element selected from the group consisting of boron, silicon and mixtures of boron and silicon, at least one compound selected from the group consisting of nickel fluoride, iron fluoride, manganese fluorides and cobalt fluorides, in a total amount of up to 50% by weight of said alloy, and joining parts by melting said mixture in contact with said parts, in an atmosphere selected from the group consisting of hydrogen and argon atmospheres.

3. The method which comprises mixing with a nickel-silicon-boron brazing alloy, nickel fluoride in an amount up to 50% by weight of said alloy, and brazing parts with said mixture in a hydrogen atmosphere, whereby an exothermic reaction occurs, the nickel fluoride is reduced, and the nickel which is left is readily absorbed in the brazing alloy, and the brazing alloy is thus diluted to the extent of the increased nickel content.

4. The method which comprises mixing with a nickel-silicon-boron brazing alloy, nickel fluoride in an amount up to 50% by weight of said alloy, and brazing parts with said mixture in an argon atmosphere, whereby a reaction occurs in which boron-trifluoride and silicon tetrafluoride are formed and disappear as gases, and the nickel is absorbed in the brazing alloy.

References Cited in the file of this patent

UNITED STATES PATENTS

| | | |
|---|---|---|
| 2,494,238 | Griggs et al. | Jan. 10, 1950 |
| 2,914,848 | Blum et al. | Dec. 1, 1959 |
| 2,955,958 | Brown | Oct. 11, 1960 |